US010556288B2

(12) United States Patent
Axinte

(10) Patent No.: US 10,556,288 B2
(45) Date of Patent: Feb. 11, 2020

(54) SOLDERING IRON TIP

(71) Applicant: Dragos Axinte, Issaquah, WA (US)

(72) Inventor: Dragos Axinte, Issaquah, WA (US)

( * ) Notice: Subject to any disclaimer, the term of this patent is extended or adjusted under 35 U.S.C. 154(b) by 0 days.

(21) Appl. No.: 15/940,858

(22) Filed: Mar. 29, 2018

(65) Prior Publication Data

US 2019/0299312 A1 Oct. 3, 2019

(51) Int. Cl.
*B23K 3/03* (2006.01)
*B23K 3/02* (2006.01)

(52) U.S. Cl.
CPC ............ *B23K 3/0315* (2013.01); *B23K 3/025* (2013.01); *B23K 3/0307* (2013.01); *B23K 3/0323* (2013.01)

(58) Field of Classification Search
None
See application file for complete search history.

(56) References Cited

U.S. PATENT DOCUMENTS

| | | | | |
|---|---|---|---|---|
| 2,210,352 A * | 8/1940 | Albietz | ................ | B23K 3/0307 219/230 |
| 2,504,338 A * | 4/1950 | MacLatchie, Jr. | .... | F16B 19/125 439/481 |
| 3,032,637 A * | 5/1962 | Wasserlein | ........... | B23K 3/0307 219/234 |
| 3,320,401 A * | 5/1967 | Zachry | ................. | B23K 20/007 219/119 |
| 3,337,713 A * | 8/1967 | Abrams | ................ | B23K 3/0307 219/234 |
| 3,879,598 A * | 4/1975 | Darling | ................... | A47C 17/22 297/180.15 |
| 4,504,723 A * | 3/1985 | Gobran | ................ | B23K 1/0004 219/119 |
| 6,646,228 B2 * | 11/2003 | Axinte | ................. | B23K 3/0307 219/231 |
| 6,797,924 B1 * | 9/2004 | Axinte | ................. | B23K 3/0307 219/220 |
| 2002/0047001 A1 * | 4/2002 | Axinte | ................. | B23K 3/0307 219/231 |
| 2004/0149713 A1 * | 8/2004 | Axinte | ................. | B23K 3/0307 219/231 |
| 2005/0242081 A1 * | 11/2005 | Howick | ............... | B60N 2/5685 219/529 |
| 2005/0247692 A1 * | 11/2005 | Axinte | ................. | B23K 3/0307 219/240 |
| 2007/0187385 A1 * | 8/2007 | Axinte | ................. | B23K 3/0307 219/229 |
| 2014/0339211 A1 * | 11/2014 | Barfuss | .................. | B60N 2/002 219/202 |

(Continued)

*Primary Examiner* — Joseph M Pelham
(74) *Attorney, Agent, or Firm* — Rowan TELS LLC

(57) ABSTRACT

The present invention provides a soldering iron with a tip having two separate halves that are electrically isolated from one another. When both halves of the tip are applied to an electrically conductive material, such as the material to be soldered, an electrical circuit between the tip halves and an electrical power source is completed. Therefore, the tip can reach operating temperatures quickly. When the tip is removed from the joint, the electrical circuit is broken and the tip material may quickly cool to a temperature safe for human contact. The tip material permits higher power outputs than other battery operated portable soldering irons and heat and cools faster the conventional soldering tips.

19 Claims, 9 Drawing Sheets

(56) References Cited

U.S. PATENT DOCUMENTS

2017/0217284 A1\* 8/2017 Ji .................. B60H 1/00292
2017/0325287 A1\* 11/2017 Ji ..................... H05B 1/0236
2017/0347396 A1\* 11/2017 Yeung ............. H05B 1/0236
2018/0054858 A1\* 2/2018 Dry .................. B60N 2/5642

\* cited by examiner

SOLDERING IRON TIP

FIELD

The present invention relates to cordless electrical devices, more specifically, to soldering irons and soldering iron tips.

BACKGROUND

In many industries and for some hobbyists, it is necessary to manually make electrically conductive connections between various electrical components. In order to make such connections, a wide variety of soldering irons have been developed, for use in a variety of applications, ranging from repair of printed circuit boards, use in the telecommunications industry, and use in the manufacture and repair of heavy industrial electrical and electro-mechanical equipment. Existing soldering irons vary by power source, application, performance, shape, size, temperature, tip type, heat source, price, and portability.

Regardless of the size or capability of the soldering iron, existing soldering iron tips are generally categorized into two main types. The first consists of a heating element surrounded by a non-conductive film material, which is then covered by a thermally conductive metallic shell. The tip is heated by the application of electricity to the heating element. Depending on the application, the tip size can vary widely. The power source may also vary, ranging from 2.4 volt batteries through a 220 volt alternating current conventional outlet. Regardless of the power source, the flow of electricity to the heating element is typically controlled by a switch in the electrical circuit leading to the heating element. The switch is often a manual switch located on the outer case of the soldering iron.

An alternate soldering iron tip includes a solid tip of a thermally conductive material, usually a metal, which is heated by burning butane. Such soldering irons are typically portable, and the butane is supplied from a cartridge within the tool.

A number of problems exist with the current types of soldering irons. Soldering irons that must be plugged into a conventional electrical outlet lack mobility and are restrictive in use. Regardless of the tip type, the time generally required to reach soldering temperatures initially ranges from 10 to 180 seconds. If the soldering iron has not completely cooled down between uses, subsequent uses may not require as much startup time, but are still not immediate. Similarly, the time required for desired cooling can be substantial, posing the danger of burns to the operator and his or her surroundings after the tool has been removed from the work surface and before the tool has cooled. Furthermore, metal tips may become soldered to the connection, damaging the connection as the tip is removed and requiring further repair.

Existing cordless soldering irons resolve the mobility issues with soldering irons connected to conventional outlets, but at the cost of further problems. Butane irons require the operator to store and maintain a highly flammable gas and do not resolve the other deficiencies noted above. Existing battery-powered cordless soldering irons can typically make only 125 connections per full charge and are only capable of equivalent power output in the range of about 15-25 watts.

In order to ensure that the operator is able to adequately view the joint to be soldered, existing electric soldering irons are sometimes provided with a small lamp disposed on the soldering iron to illuminate the tip and connection. In these devices, the light is controlled by the same switch that controls the flow of electricity to the heating element. A disadvantage of this system is the inability to use the light without heating the tip of the soldering iron. This requires the operator to carry a separate flashlight if he or she wishes to illuminate the surroundings without soldering or heating.

As noted above, soldering irons are primarily used for making electrically conductive connections in various forms of electrical and electronic equipment. A visual inspection of the soldered connection may not always accurately determine whether or not the connection has been formed correctly and is now electrically conductive. Therefore, those operators who wish to test their connection, or to test electrical continuity between any two other points in the circuit, must carry a separate continuity tester.

Thus, a need exists for a soldering iron that can heat up and cool down quickly, minimizing the risk of burning the operator and/or his or her surroundings. Ideally, the soldering iron would be portable and could be used to form a large number of connections at high power output without having to be recharged. There is a further need for a portable soldering iron which can also be used as a flashlight and/or a continuity tester, reducing the number of tools to be carried by the operator to the site of the work.

BRIEF SUMMARY

Generally described, the present invention provides a soldering iron, with a semiconductive tip having two separate halves that are electrically isolated from one another. The tip halves are each electrically connected to the opposite sides of an electrical power source. When both halves of the tip are applied to an electrically conductive material, such as the material to be soldered, an electrical circuit between the tip halves and electrical power source is completed. The halves of the tip are constructed from material having high electrical resistivity and low thermal conductivity. Therefore, the heat creation is focused in the very front end of the tip, where it is needed, and the mass of the area being heated remains small. As a result, the area of the tip that is applied in soldering reaches operating temperatures quickly. When the tip is removed from the joint, the electrical circuit is broken and the tip material cools quickly, because only a small mass of it was heated.

Because electricity is only able to flow when the two pieces of the tip are electrically connected, no separate switch is required. Furthermore, the soldering iron may be used without waiting for the tip to heat. The tip also reduces the risk of burning the operator and/or his or her surroundings because it heats up and cools down quickly. Furthermore, the tip material eliminates the risk of the tip becoming stuck in the joint. The tip material also permits higher power outputs than other known battery-operated portable soldering irons and permits, for example, at least 300 joints and as many as 1,200 joints for each full charge.

In accordance with further aspects of the present invention, in one embodiment, the soldering iron also includes a light disposed on the case to illuminate the tip and connection. The light is controlled by a separate switch and permits the tool to be used to illuminate the operator's surroundings without actually having to heat the tip. This aspect of the invention permits the operator to avoid the necessity of carrying a separate light source when working or intending to work in areas without sufficient lighting.

In accordance with other aspects of the invention, another embodiment is provided in which the tool also includes a circuit and light providing a proxy indication of when the tip is hot or cool. This aspect of the invention utilizes the two electrodes in a multifaceted manner, for both heating the joint and for sampling and responding to the resistivity of the tip.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
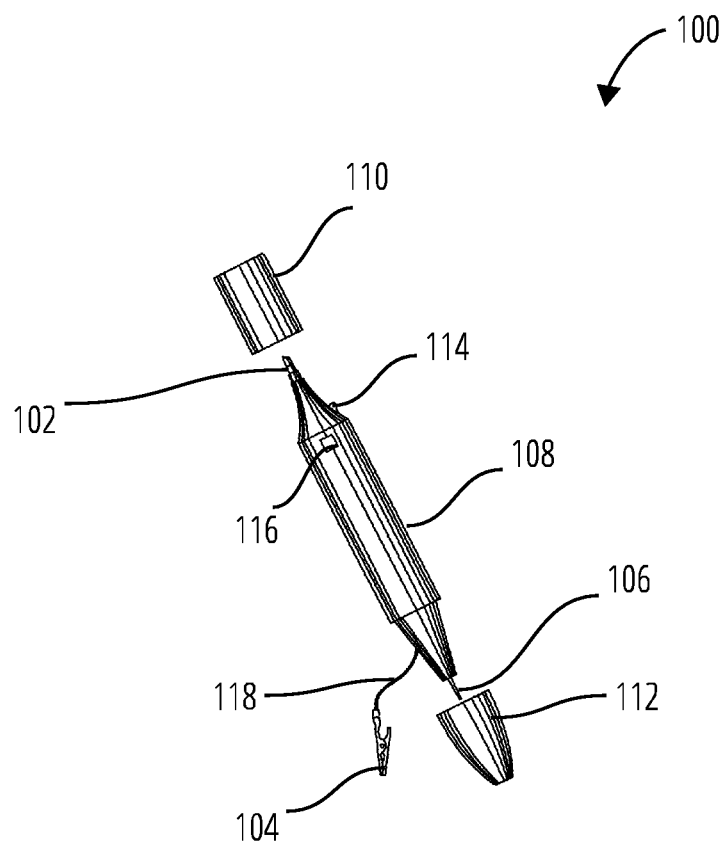
FIG. 1 illustrates a soldering iron 100 in accordance with one embodiment.
Figure 2:
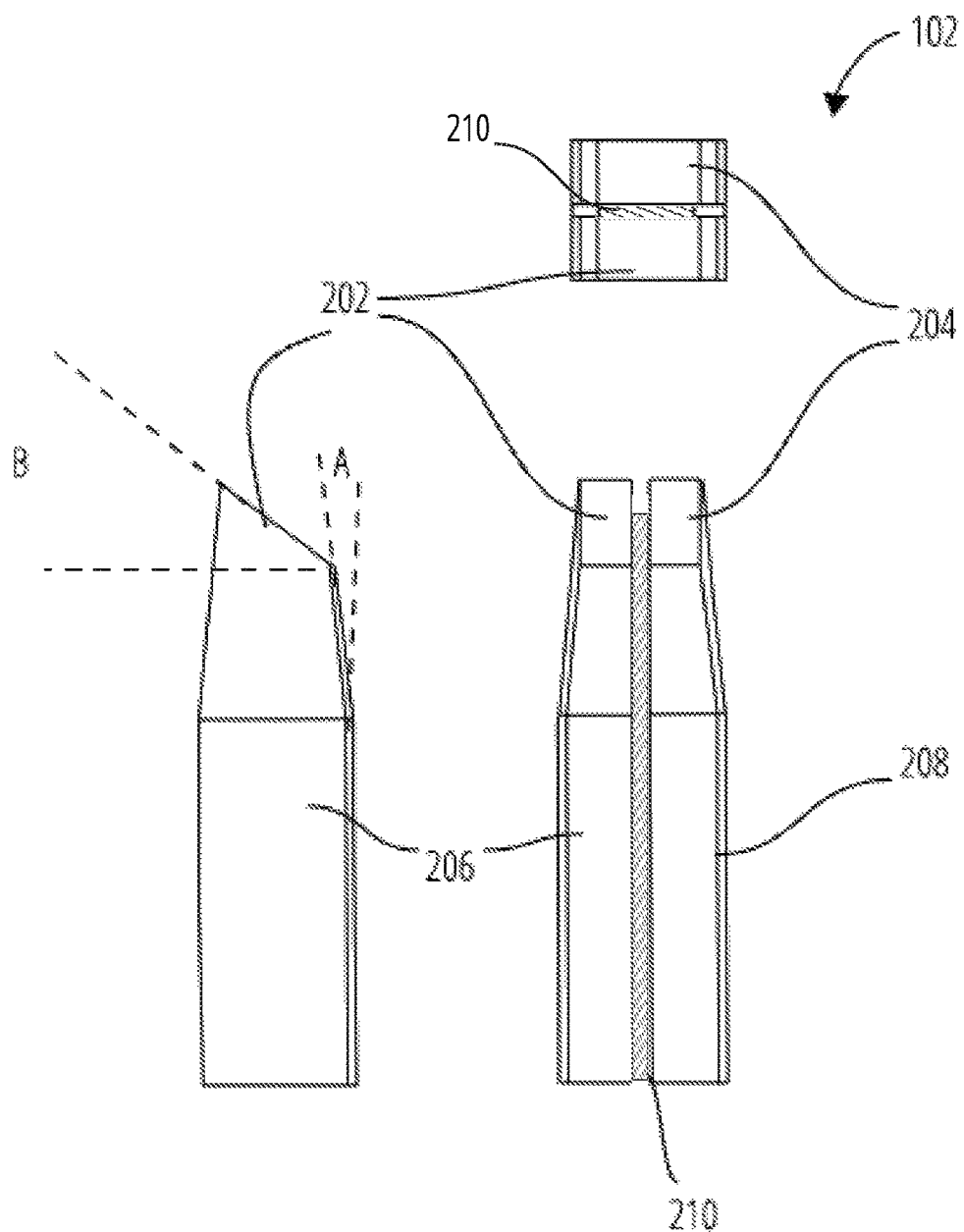
FIG. 2 illustrates a soldering tip 102 in accordance with one embodiment.
Figure 3:
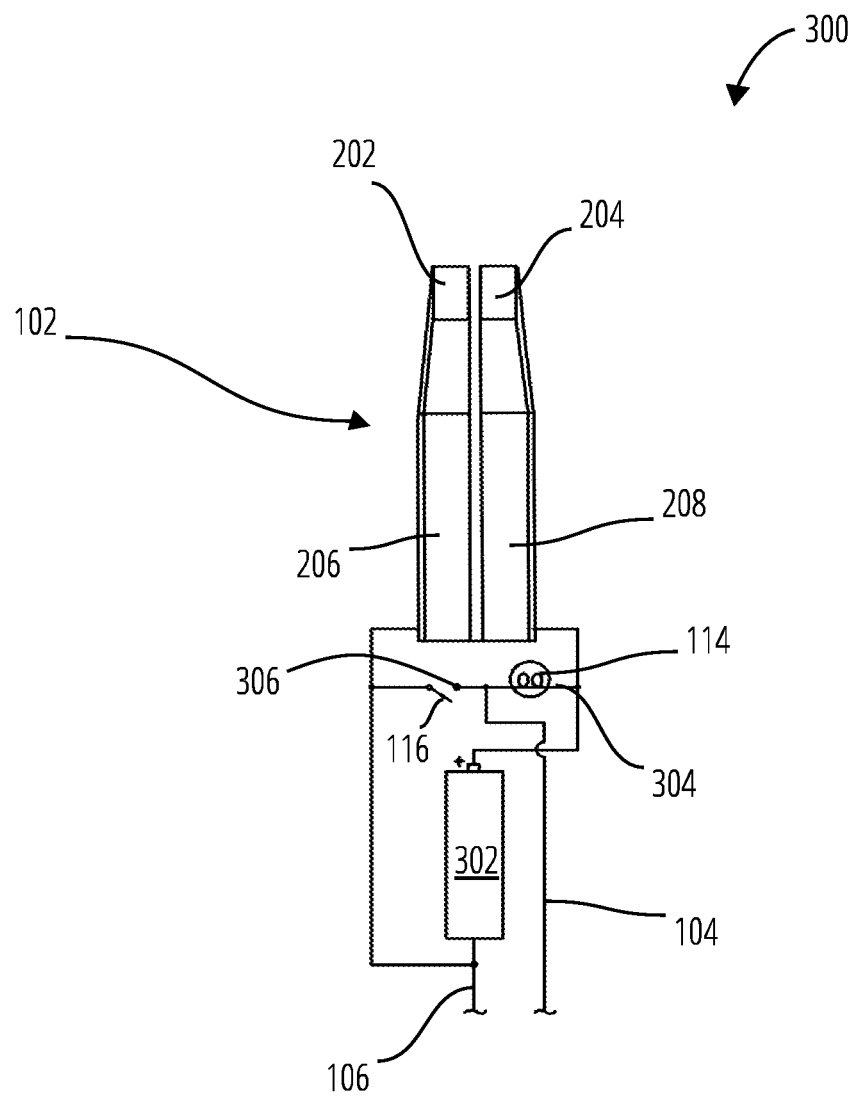
FIG. 3 illustrates a soldering circuit 300 in accordance with one embodiment.
Figure 4:
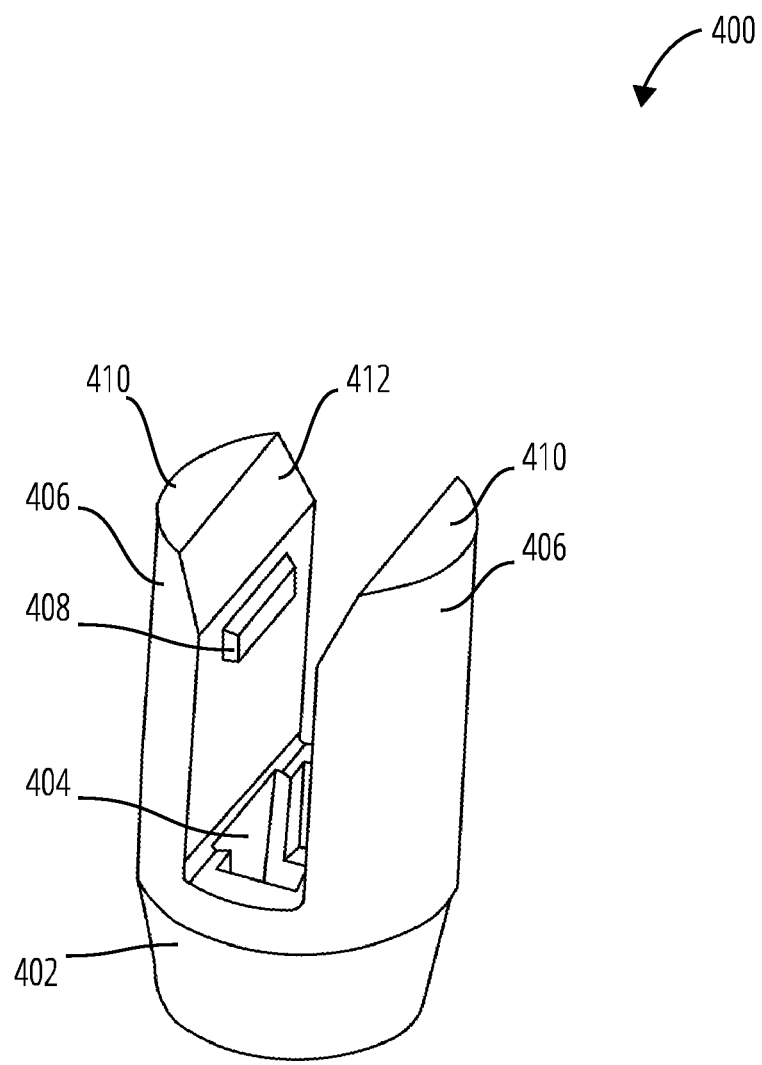
FIG. 4 illustrates a perspective view of a collet 400 for retaining and manipulating a soldering iron tip in accordance with one embodiment.
Figure 5:
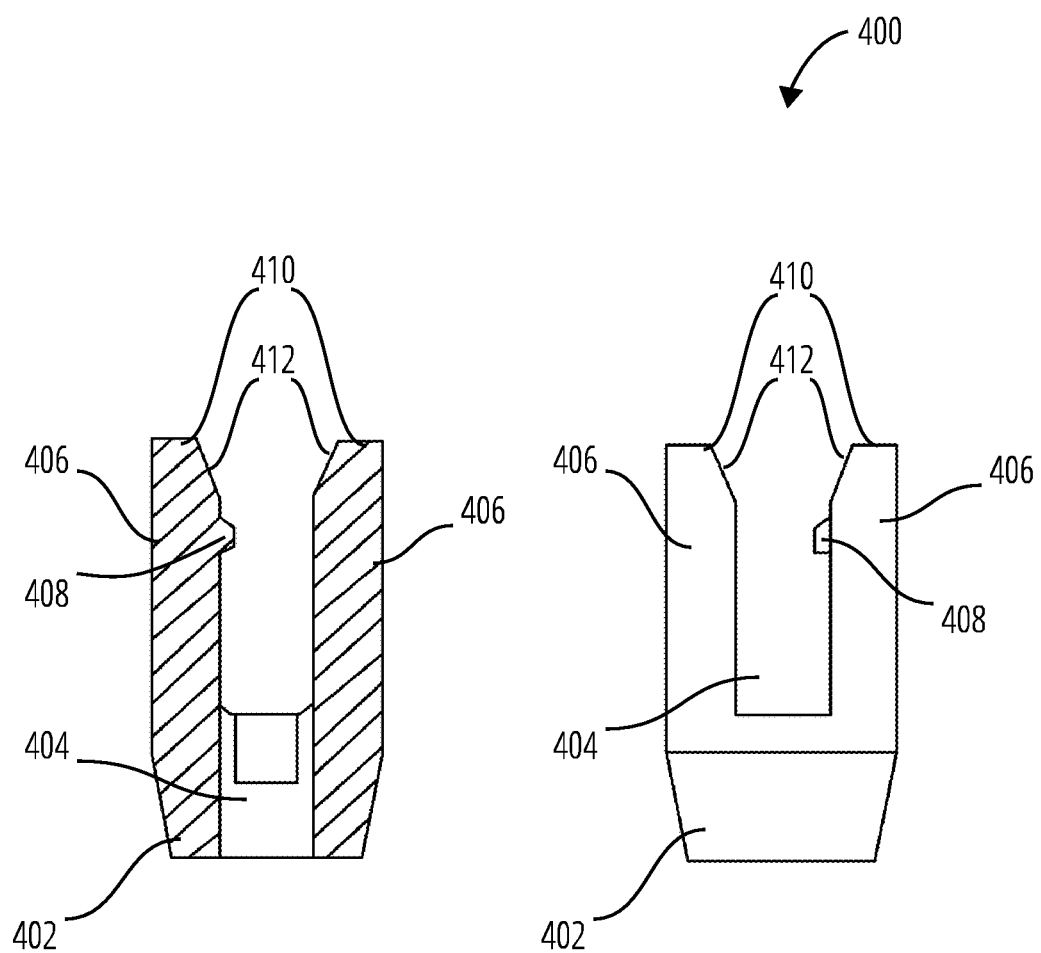
FIG. 5 illustrates a front view and cutaway front view of a collet 400 in accordance with one embodiment.
Figure 6:
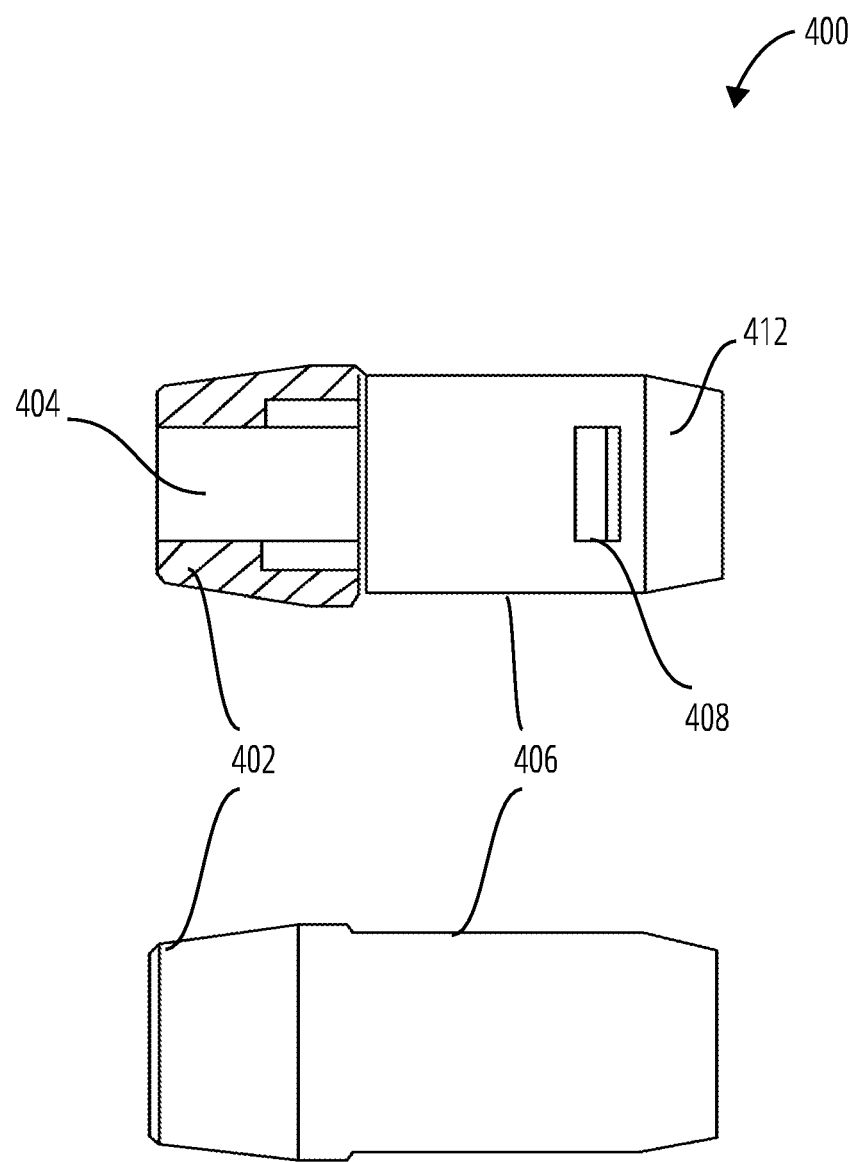
FIG. 6 illustrates a side view and a cutaway side view collet 400 in accordance with one embodiment.
Figure 7:
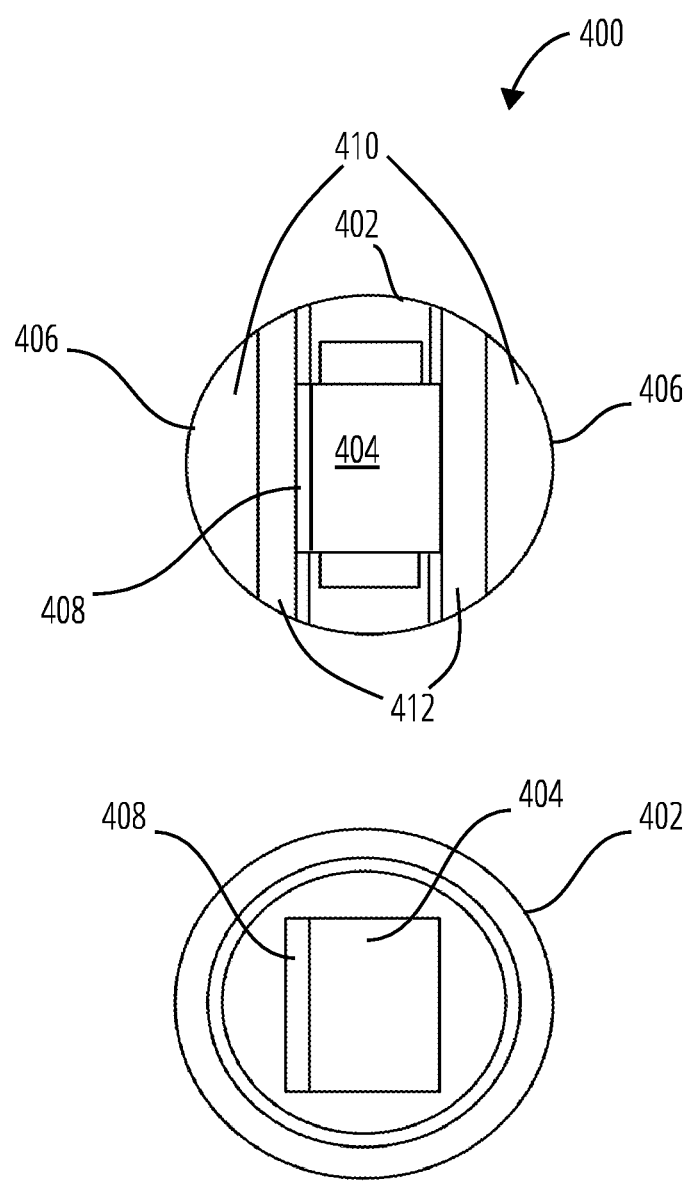
FIG. 7 illustrates a top view and a bottom view of a collet 400 in accordance with one embodiment.

Referencing FIG. 1 through FIG. 3, one embodiment of a soldering iron 100 formed in accordance with the present invention is shown. The soldering iron 100 includes a soldering tip 102 attached to a body 108, a light 114 disposed on the body 108 to illuminate the soldering tip 102 and surrounding work surfaces (not shown), a switch 116 disposed on the body 108 to control the light 114, a lead 104 and a continuity testing probe 106 disposed on body 108. Cover 110 and cover 112 are available to protect the soldering tip 102 and probe 106/lead 104 from damage. The covers are removably fixed to the body 108 by conventional means, for example, a friction fit, a clamp, threaded surfaces, etc.

In more detail, the body 108 includes an elongate substantially tubular member of rigid heat resistant material, such as plastic or other materials known to those skilled in the art. The body 108 is a unitary structure, assembled in parts, and configured to hold the sub-components described below. Those skilled in the art will recognize that the configuration of the body 108 can vary widely for use in different applications.

The soldering tip 102 includes a first electrode 208 and a second electrode 206, electrically isolated from one another by an electrical insulator 210 disposed therebetween. The first electrode 208 and second electrode 206 are cross-sectionally shaped as rectangles, possibly squares. In the longitudinal direction, each electrode is tapered along its distal third at an angle A and is further truncated at the distal tip by an angle B, thereby forming a flat, angled first surface element 202 and second surface element 204 for application to the joint to be soldered. Those skilled in the art will recognize that the size and shape of the soldering tip 102 can also vary widely for use in different soldering applications.

The electrodes are preferably formed of graphite, or a material containing graphite. For example, battery electrodes containing graphite, such as battery electrodes obtained from Eveready® Super Heavy Duty Lantern Battery Model No. 1209, manufactured by Eveready Battery Company, Inc., Cleveland, Ohio, although potentially prone to mechanical failure due to lacking in desired density and flexural strength, may nonetheless comprise electrical resistivity and thermal conductivity that are adequate but not optimal. The electrodes may alternatively be formed from other materials that are semi-conductive electrically, and which have low thermal conductivity.

The electrical resistivity of the electrode materials should be a minimum of 3,000 micro-Ohm cm, and in one embodiment is 3,500 micro-Ohm cm. The thermal conductivity is in a range between 5 and 10 BTU hr-ft-° F. In one embodiment, the thermal conductivity is 6.35 BTU hr-ft-° F.

Upon the application of electricity, the electrode material reaches a temperature of approximately 600° F. within a few seconds, and remains a solid at temperatures in excess of about 1,000° F. Furthermore, the electrode material preferably has sufficient compressive and tensile strength to permit the electrodes to be manufactured to tolerances of less than about 1 mm, rigidly held in place by the body 108 and applied to the connection to be soldered without mechanical failure. The electrode materials should have a density of at least 1.6 g/cc, and in one particular embodiment, a density of 1.65 g/cc. The electrode materials should have a minimum flexural strength of 3000 psi. In one particular embodiment, the flexural strength is 7,252 psi.

In one embodiment, an electrical insulator 210 between the electrodes is formed of a solid dielectric material that is able to withstand temperatures in excess of about 1,000° F. without changing state. The electrical insulator 210 between the first electrode 208 and the second electrode 206 is preferably a high-temp resistant epoxy that applies as a thin liquid layer that then hardens. This type of electrical insulator 210 enables a reduction in the gap between the electrodes from conventional designs, which makes the tip more accurate and easier to work with. This type of electrical insulator 210 may also act as a glue, which simplifies the design of the collet 400 that holds the whole soldering tip 102 assembly together. The glue preferably has a dielectric strength greater than 200 V/mm, more preferably greater than and 20 KV/mm. The gap separating the electrodes, in which the glue is applied, is preferably less than 1 mm.

The rectangular or square cross-section of the electrodes improves the strength of the soldering tip 102 and enables shapes for the first surface element 202 and second surface element 204 that are more convenient and suited to different soldering applications.

The soldering tip 102 is attached in any conventional manner, preferably in detachable manner, to the body 108. Those skilled in the art will recognize that the means of attaching and detaching the soldering tip 102 to the body 108 can vary widely for use in different soldering applications. Making the soldering tip 102 detachable also permits the use of different tips for different applications with the same tool. When secured, the electrodes are separately electrically connected to the positive and negative terminals of power source 302 in a conventional manner. A variety of types of power source 302 can be used, including rechargeable or non-rechargeable batteries, or low voltage provided from line voltage through a transformer. One example of power source 302 is a set (e.g., four) of alkaline batteries. The electrodes can optionally be electrically isolated from the power source 302 by a switch or other means for interrupting the flow of electricity in an electrical circuit.

When both the first electrode 208 and the second electrode 206 are applied to an electrically conductive or semi-conductive material, such as solder, an electrical circuit is completed from the positive terminal of power source 302, through first electrode 208, through the material to be heated (such as solder or an electrical part lead) to which the soldering tip 102 has been applied, through second electrode 206 and back to the negative terminal of power source 302. The flow of electricity causes the first electrode 208 and the second electrode 206 to heat to a temperature of about 600° F. or greater within a few seconds, allowing the soldering iron 100 to thereafter be used in the same manner as a conventional soldering iron. As configured, the soldering iron 100 provides an alternating current equivalent of about 25-50 watts of heat to the joint to be soldered. An additional property of the preferred material for the electrodes is that it cannot become soldered to the joint while being used. When the operator of the apparatus wants to cease the application of heat, the soldering tip 102 can be removed from the electrically conductive or semi-conductive material, interrupting the flow of electricity. When the electricity is interrupted, the electrodes cool to a temperature safe for contact with human skin or clothing within a few seconds.

The soldering iron 100 optionally includes a light 114, for example, an incandescent light bulb or light emitting diode. The light 114 positioned on the body 108 so that the light emitted will illuminate the soldering tip 102 and the surrounding work area during use. The light 114 is electrically connected to the power source 302 and controlled by the switch 116. When the switch 116 is closed, the circuit is completed from one terminal of the power source 302, through the switch 116, through the light 114, and back to the opposite terminal of power source 302, illuminating the light 114 without applying electricity to the soldering tip 102. Because electric light 114 may be switched on without heating the soldering tip 102, the light may be used to illuminate the surroundings of the operator without risk of accidentally burning the operator or nearby combustible materials.

The soldering iron 100 may further optionally be provided with a continuity testing assembly having a continuity testing lead 104 and a continuity testing probe 106. The lead 104 further includes a wire 118, for example, a 26 gauge wire, extending from the body 108 at one end and, for example, an alligator clip attached at the distal end of the wire 118. The continuity testing probe 106 is a probe similar to those used in conventional electrical test equipment, for example, a short, rigid, electrically conductive needle-shaped probe. It will be readily apparent to those skilled in the art that the continuity testing lead 104 and continuity testing probe 106 can be formed of any electrically conductive material without departing from the spirit and intention of the invention.

The continuity testing lead 104 is electrically connected to the power source 302 via a path extending through the light 114. The probe 106 is connected to the opposite terminal of the power source 302. The soldering tip 102 is connected in series to the power source 302. An electrical path 304 is provided in parallel with the soldering tip 102. The light 114 and the switch 116 are placed in series along the electrical path 304. The lead 104 is connected to the electrical path 304 at node 306 located between the light 114 and switch 116. The assembly is used to test a circuit by affixing the lead 104 to one side of the circuit to be tested and touching the probe 106 to the opposite side of the circuit. If the circuit being tested is electrically continuous, current will flow from the power source 302, through the light 114, through the continuity testing lead 104, through the circuit being tested, through the continuity testing probe 106, and back to the power source 302, thus completing the circuit and illuminating light 114. The illumination of the light 114 quickly demonstrates the continuity of the tested circuit. This embodiment is particularly useful for cordless soldering irons, because the operator can test the soldered joint without having to obtain or carry a separate tool.

Referencing FIG. 4-FIG. 7, a collet 400 is illustrated to retain the soldering tip 102 in the soldering iron 100 in an easily interchangeable manner. The collet 400 comprises a receiver 402 to accept the soldering tip 102 and a channel 404 into which the soldering tip 102 is further guided into the collet 400 until it engages a channel stopper 408. Two prongs 406 extend from the base and can be engaged with a soldering iron, to heat the tip. Each of the prongs 406 includes a flattened end 410 and a tapered surface 412.

Figure 9:
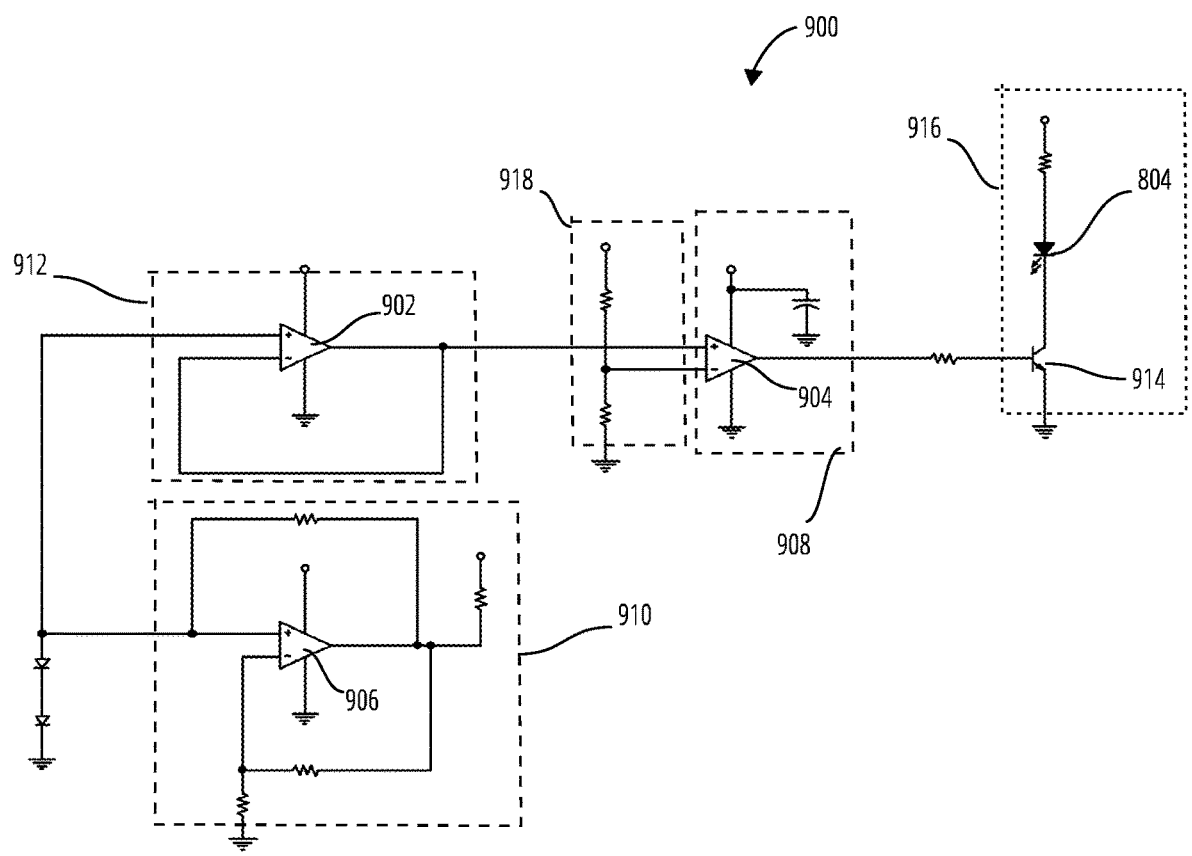
FIG. 9 illustrates an embodiment of a tip temperature indicator circuit 900.

The collet 400 electrically couples the two sections of the tip 102 to the electrical circuit shown in FIG. 3 or 9, while allowing the user to handle it, turn it, and remove it, even while the tip 102 is hot. The collet is formed from low thermal conductivity and high heat deflection temperature material. Materials with these properties are available and known in the art.

Figure 8:
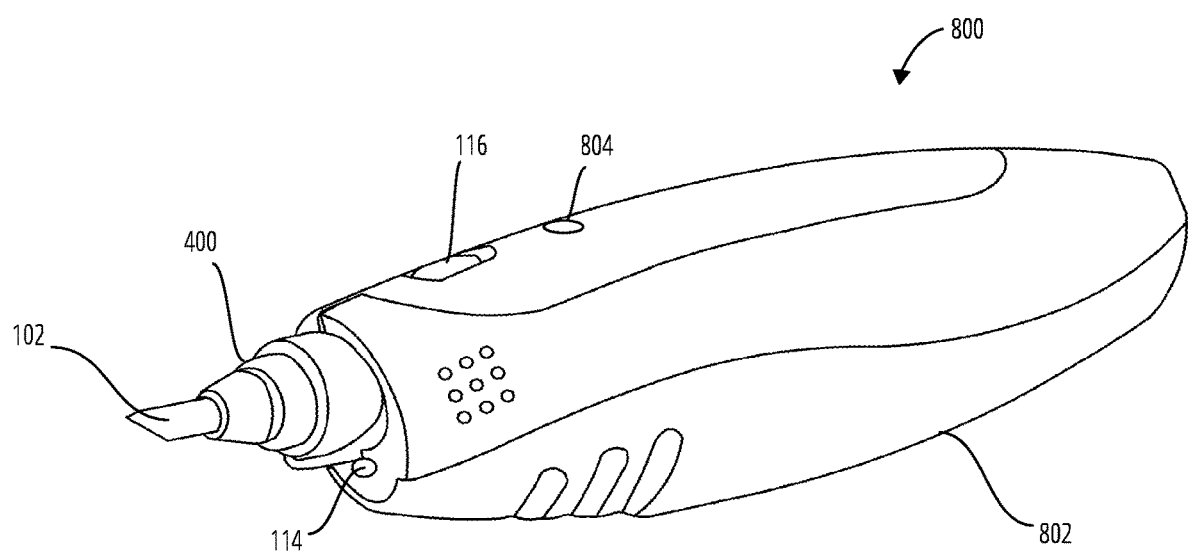
FIG. 8 illustrates an alternate embodiment of a soldering iron 800.

Referring to FIG. 8, an alternate embodiment of a soldering iron 800 comprises a soldering tip 102, a light 114, a switch 116, a collet 400, and a body 802. A red LED 804 is provided on the body 802. The illustrated location of the red LED 804 on the body 802 is merely an example.

The collet 400 retains the soldering tip 102 to the body 802. The switch 116 is operable to switch on and switch off the light 114. The red LED 804 may automatically switch on when the soldering tip 102 is dangerously hot, and may switch off automatically at an approximate time when the soldering tip 102 is safely cooled down.

Referring to FIG. 9, a tip temperature indicator circuit 900 comprises a measurement stage 910 comprising a resistor network and an operational amplifier 906, a voltage follower stage 912 comprising an operational amplifier 902, a voltage divider 918 and output of the voltage follower stage 912 providing inputs to a comparator stage 908, and a lighting circuit 916 comprising a comparator stage 908 and a switch 914 operated by the output of the comparator stage 908. The a tip temperature indicator circuit 900 comprises a detector to signal a voltage across the gap between the electrodes falling below a set level, and in response to the signal to activate a light, which acts as an accurate proxy to the temperature of the tip 102, due to the unique fast cooling aspects of the tip 102.

The purpose and function of various unlabeled components of the tip temperature indicator circuit 900 (e.g., resistors, capacitors, source voltage terminals) will be readily apparent to those of ordinary skill in the art.

The tip temperature indicator circuit 900 operates by applying the measurement stage 910 two measure a voltage potential between the first electrode 208 and the second electrode 206 of the soldering tip 102. The measured potential is provided to the voltage follower stage 912 which provides isolation between the measurement stage 910 and the comparator stage 908.

The comparator stage 908 closes the switch 914 and turns on the red LED 804 when the output of the voltage follower stage 912 exceeds the threshold voltage level set by the voltage divider 918. An example threshold voltage level is 4.8V.

In one embodiment, the power source 302 output is 6V and this is the potential between the electrodes of the tip 102. When the tip 102 applied for soldering, the voltage across the electrodes drops to about 4.8V. The circuit 900 detects this voltage drop and turns on the red LED 804 (colors other than red may be used as well). When the tip 102 is removed from the soldering point, the voltage rises back up to 6V (approximately, for example the tip voltage may settle somewhat lower at 5.4V) and the circuit 900 turns off the red LED 804. Because the tip 102 heats and cools very quickly, the red LED 804 represents accurately whether the tip is hot or cool. In addition, the red LED 804 indicates to the user that proper contact has been made with the soldering point. If the user is not utilizing the tool properly, the red LED 804 will not come on and the user will know to modify the holding angle or position etc.

What is claimed is:

1. A tip assembly for a soldering iron powered by an electrical power means, the tip assembly comprising two electrodes, each of the two electrodes formed from a material comprising:
   an electrical resistivity of at least 3,000 micro-Ohm cm;
   a thermal conductivity is in a range between 5 and 10 BTU hr-ft-° F.;
   a flexural strength of at least about 3000 psi;
   a density of at least 1.6 g/cc;
   the two electrodes electrically isolated from one another by an insulator disposed between them, the insulator is a glue applied as a liquid; and
   the two electrodes configured to be separately electrically connected to positive and negative terminals of said electrical power means.

2. The tip assembly of claim 1, wherein the two electrodes each have electrical resistivity of 3,500 micro-Ohm cm.

3. The tip assembly of claim 1, wherein the two electrodes each have a thermal conductivity of 6.35 BTU hr-ft-° F.

4. The tip assembly of claim 1, wherein the two electrodes each have density of 1.65 g/cc.

5. The tip assembly of claim 1, wherein:
   the two electrodes each have thermal conductivity of 6.35 BTU hr-ft-° F.;
   the two electrodes each have electrical resistivity of 3,500 micro-Ohm cm; and
   the two electrodes each have density of 1.65 g/cc.

6. The tip assembly of claim 1, wherein the glue has a dielectric strength greater than 200 V/mm and a gap separating the electrodes, in which the glue is applied, is less than 1 mm.

7. The tip assembly of claim 1, further comprising:
   a collet formed to electrically couple the two electrodes while securing the tip assembly to the soldering iron.

8. The tip assembly of claim 1, wherein the two electrodes each have a rectangular cross section.

9. The tip assembly of claim 8, wherein the two electrodes each have a square cross section.

10. A soldering apparatus comprising a tip attached to a body and an electrical power means, wherein said tip is rigidly held in place by said body and said tip comprises:
    two electrodes, each electrode formed from a material comprising:
      an electrical resistivity of at least 3,000 micro-Ohm cm;
      a thermal conductivity is in a range between 5 and 10 BTU hr-ft-° F.;
      a flexural strength of at least about 3000 psi; and
      a density of at least 1.6 g/cc;
    the two electrodes electrically isolated from one another by an insulator disposed between them, the insulator is a glue applied as a liquid; and
    the two electrodes separately electrically connected to positive and negative terminals of said electrical power means.

11. The soldering apparatus of claim 10, wherein the two electrodes each have electrical resistivity of 3,500 micro-Ohm cm.

12. The soldering apparatus of claim 10, wherein the two electrodes each have a thermal conductivity of 6.35 BTU hr-ft-° F.

13. The soldering apparatus of claim 10, wherein the two electrodes each have a density of 1.65 g/cc.

14. The soldering apparatus of claim 10, wherein the glue has a dielectric strength greater than 200 V/mm and a gap separating the electrodes, in which the glue is applied, is less than 1 mm.

15. The soldering apparatus of claim 14, further comprising:
    a light circuit comprising a detector to signal a voltage across the gap falling below a set level and in response to the signal to activate a light.

16. The soldering apparatus of claim 15, further comprising:
    a collet formed to electrically couple the two electrodes while securing the tip to the body.

17. The soldering apparatus of claim 10, wherein:
    the two electrodes each have thermal conductivity of 6.35 BTU hr-ft-° F.;
    the two electrodes each have electrical resistivity of 3,500 micro-Ohm cm; and
    the two electrodes have density of 1.65 g/cc.

18. The soldering apparatus of claim 10, wherein the two electrodes each have a rectangular cross section.

19. The soldering apparatus of claim 18, wherein the two electrodes each have a square cross section.

* * * * *